United States Patent Office 3,532,911
Patented Oct. 6, 1970

3,532,911
DYNAMIC BRAKING OF ACOUSTIC TRANSDUCERS
Henry Roberts, Fairlawn, N.J., and Maurice J. Epstein and Earl Heier, Ardsley, N.Y., assignors, by mesne assignments, to the United States of America as represented by the Secretary of the Navy
Filed July 26, 1968, Ser. No. 747,915
Int. Cl. H01v 7/00
U.S. Cl. 310—8.1        1 Claim

ABSTRACT OF THE DISCLOSURE

There is disclosed a dynamic braking technique for preventing ringing of a transducer after the removal of its energizing signal. The braking is achieved by reversing the phase of the driving signal for a predetermined time interval at the end of the energizing period. This time interval is approximately equal to $0.221Q/f$ for Q values greater than 5.

---

The invention described herein may be manufactured and used by or for the Government of the United States of America for governmental purposes without the payment of any royalties thereon or therefor.

The present invention relates generally to control circuits for energizing electroacoustic transducers and, more particularly, to an arrangement for curtailing the ringing of the transducer after the removal of its energizing signal.

There are numerous situations, such as those encountered in the testing and calibration of electroacoustic transducers, where it is highly desirable that the transducer output terminate substantially coincidental with the removal of the driving signal. The ringing tail which normally persists after the driving signal is removed is objectionable since it may overlap a portion of the receiving period and complicate the identification of echo signals produced by reflections and reverberation. Should, of course, the same transducing element be employed for both transmission and receiving functions, the ringing would tend to prevent the immediate switchover to the receiving mode.

It is accordingly the primary object of the present invention to control the operation of an electrical transducer so as to minimize the ringing action caused by the termination of the driving signal.

Another object of the present invention is to provide a control signal for a crystal-type transducer having a predetermined terminal portion thereof of reverse phase so as to minimize the ringing tail normally present at the end of the energizing period.

Another object of the present invention is to provide a dynamic braking technique for a transducer which involves changing the phase of a terminal portion of the energizing signal, which terminal portion is related to the Q of the transducer circuit and the frequency of the energizing signal.

Other objects, advantages and novel features of the invention will become apparent from the following detailed description of the invention when considered in conjunction with the accompanying drawings wherein.

Figure 1:
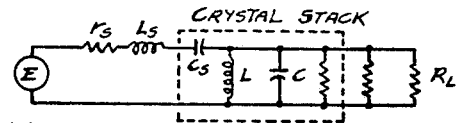
FIG. 1 is a series of progressively simplified, equivalent circuits helpful in analyzing the operation of the present invention.
Figure 1:
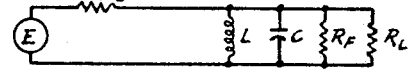

In FIG. 1A there is shown the equivalent circuit of a typical high gain, crystal-type transducer. In this circuit, $R_L$—the acoustic output load,
L and C—the parallel inductance and capacitance associated with the crystal stack,
$C_S$—the equivalent coupling capacitor associated with the crystal stack,
$L_S$—the added series inductor to resonate with $C_S$ at $\omega_0$, and
$r_s$—the series resistance associated with $L_S$.

An approximate equivalent of this circuit is shown in FIG. 1B where $r_s$ is more significant than the combination of $X_{CS}$ and $X_{LS}$. In this circuit, $R_F$ stands for all of the associated losses less $r_s$.

The Thevenin equivalent of circuit 1B is shown in FIG. 1C which, it will be seen, is a rather basic RLC arrangement readily susceptible of analysis.

When the circuit of FIG. 1C is driven by a low impedance source, the effective Q may be described as $Q_1 = R/\omega_0 L$, where R is the parallel combination of $r_s$, $R_F$ and $R_L$. If the driving voltage, however, is suddenly disconnected from the LC tank circuit by a switching operation, the effective Q increases suddenly and becomes $Q_2 = R/\omega_0 L$, where R now is the parallel combination of only $R_L$ and $R_F$.

After resonance buildup has occurred, the voltage across the tank circuit can be expressed in the general form $$(1) \qquad e_0(t) = A \sin \omega_0 t [1 - \epsilon^{-\alpha t}]$$

when the driving wave form is sinusoidal. A sudden disconnection of this driving signal will cause the output voltage to decay exponentially with a time constant $1/\alpha$, where $\alpha = 1/2RC = \omega_0/2Q_2$. After N cycles it will reach a level of $1/e$ of the steady-state envelope value where $N = Q_2/\pi$. It is noteworthy that an interruption of the driving signal tends to cause a much longer decaying ring because of the sudden increase in the value of Q due to the removal of the driving source impedance.

Figure 2:
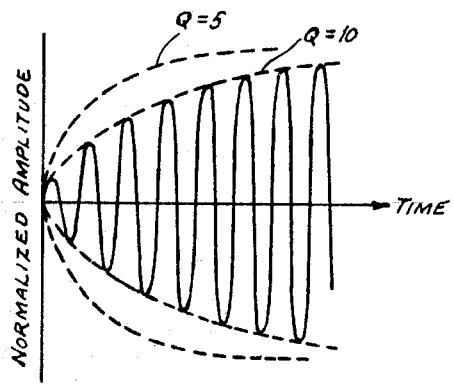
FIG. 2 illustrates a typical response of an RLC tuned circuit to a resonant frequency sinusoid.

The dynamic braking process of the present invention may, perhaps, best be understood by considering the wave form of FIG. 2 which is a typical response of an RLC tuned circuit to a resonant frequency sinusoid. To ascertain the exact number of cycles of the inverted sine wave which is required to accomplish the braking action most effectively, consider further the rise and falls of the envelope function of this wave form. Setting the rise envelope equal to the fall envelope, a condition which represents complete cancellation, will yield a solution $$(2) \qquad (1 - \epsilon^{-\alpha t}) = \epsilon^{-\alpha t}$$

where $t$ represents the required duration of the application of the application of the inverted phase signal. Solving for $t$, we obtain $$(3) \qquad t = \frac{0.693}{\alpha}$$

Since $$\alpha \approx \frac{\pi f}{Q}$$

for cases where $Q > 5$, Equation 3 may be written as $$(4) \qquad t \approx \frac{0.221 Q}{f}$$

In the case where the exciting signal has a frequency of, for example, 500 cycles and the Q of the circuit is 5, then Equation 4 will give a solution of $t = 2.21$ ms. Since the period of a 500-cycle wave form is 2.0 ms, nearly complete termination will occur 1.1 cycles after signal inversion in the example treated. As indicated hereinbefore, with no braking the number of cycles N required for the steady-state signal to dacay to a value $1/e$ is (5) $$N = Q/\pi$$

where Q this time is determined with the driving source removed and corresponds to $Q_2$, previously mentioned. With the driving source disconnected, Q may be in the order of 15 and inserting this in Equation 5, yields an N of 4.78 cycles for the time constant. Thus, for the decay discharge to drop by 98% of the steady-state voltage would require four time constants (N above was based on one time constant) or about 19.1 cycles. In comparing the case of no braking with the dynamic braking technique, this same result was achieved in about 1.1 cycles of the driving wave form.

Of course, one might argue that during the dynamic braking application period part of the resultant improvement was produced by virtue of the Q being lowered (in this case from 15 to 5). However, a threefold change in Q would, from Equation 5, have produced only a threefold improvement in lessened ring time. Since the over-all improvement created by the dynamic braking technique was of the order of 17 or 18 to 1, then the greatest part of the improvement can be directly attributed to the phase inversion employed. In view of this, the dynamic braking technique can, therefore, be expected to yield improved stopping over normal techniques wherein friction or resistance is introduced to effectively lower the over-all Q.

Figure 3:
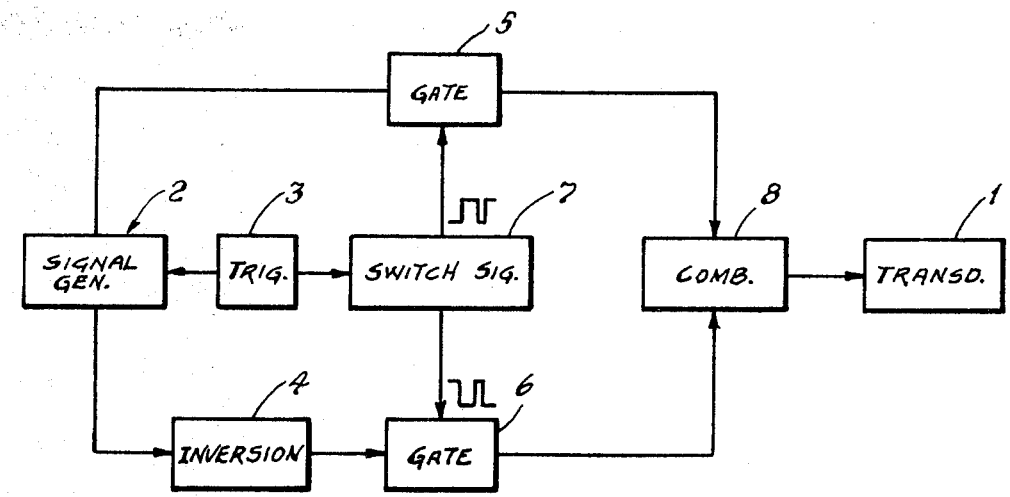
FIG. 3 is a block diagram of a simple system for producing a driving signal with the requisite inverted phase terminal portion.

In FIG. 3 there is sown a relatively simple circuit for driving a crystal transducer, for example, with a sinusoidal wave form which includes a terminating portion of reversed phase. Here, the sinusoidal signal is generated by a signal generator 2 of conventional design which may be periodically operated by a trigger circuit 3 so as to produce an output signal of controllable length. One output from this generator is subjected to a phase inversion in circuit 4 and the inverted signal resulting therefrom is fed to a gate 6. Another output from generator 2 goes directly to a second gate 5. Both gates are under the control of a switching circuit 7 which, in effect, provides complementary control signals so as to open these gates during mutually exclusive periods during the time signal generator 2 is operated. Switching circuit 7 is tied to trigger circuit 3 so that the control signals are synchronized with the operation of the signal generator during any particular cycle thereof.

At the start of the energizing pulse, gate 5 is opened so that the output of signal generator 2 passes therethrough to combining circuit 8 and to transducer 1. Gate 6 is blocked at this time so that transducer 1 is excited in a normal manner with an appropriate sinusoidal wave form.

Near the end of the excitation period, switching circuit 7 blocks gate 5 and opens gate 6. Now the inverted signal passes through gate 6 to combining circuit 8 and to transducer 1 and the dynamic braking action commences. The length of time this inverted signal is applied, of course, may be regulated by simply controlling the wave form of the control signals operating gates 5 and 6. After the braking action terminates, the system is restored to a standby position and the next cycle commences with trigger circuit 3 again activating signal generator 2 and switching circuit 7 to duplicate the mode of operation just described.

It should be recognized that the driving signal with the reverse phase termination may be produced by other circuits. For example, an appropriate portion of the signal from the signal generator 2 need only be subjected to a proper amount of delay and then added to the end of the original signal so as to bring about a phase reversal at the point of addition. Other equivalent arrangements will be obvious to those skilled in the art.

Although the dynamic braking technique has been disclosed as an effective mechanism for terminating the ringing tail of an electrical transducer, it will also be appreciated that the principle involved may be extended to electronic circuits, such as, gated oscillators or electronic ringing circuits, and may also be applied to loudspeakers, and the like, for controlling their response to pulsed operation.

It would also be pointed out that while the preferred method of dynamic braking involves completely reversing the phase of the driving signal, effective results may also be achieved with signals slightly displaced from the 180° condition. Also, the driving signal need not be sinusoidal but may be of any periodic nature, such as, for example, a square wave or its equivalent. Likewise, the principle of the present invention may also be used with frequency modulated signals, but it will be understood that with such signals the exact duration of the reversed signal portion cannot be obtained from Equation 4. However, the proper braking interval may be ascertained experimentally by observing the output wave form with selected frequencies applied over different braking periods.

Obviously many modifications and variations of the present invention are possible in the light of the above teachings. It is therefore to be understood that within the scope of the appended claims the invention may be practiced otherwise than as specifically described.

What is claimed is:

1. In a method for minimizing ringing of a crystal transducer, the steps of
   generating an AC driving signal of a preselected frequency and duration;
   exciting said crystal transducer with said driving signal;
   generating a braking signal whose frequency is the same as said driving signal and whose phase is 180° out of phase with said driving signal; and
   applying said braking signal to said crystal transducer for a time equal to $0.221Q/f$, when said driving signal terminates, where $f$ is the frequency of said driving signal and Q is the Q of the disconnected crystal transducer.

References Cited

UNITED STATES PATENTS

| | | | |
|---|---|---|---|
| 2,398,701 | 4/1946 | Firestone | 310—8.2 X |
| 2,416,337 | 2/1947 | Mason | 310—8.2 X |
| 2,649,550 | 8/1953 | Hardie et al. | 310—8.2 |
| 2,683,821 | 7/1954 | Rocha | 310—8.2 |
| 2,707,755 | 5/1955 | Hardie et al. | 310—8.2 |
| 2,881,336 | 4/1959 | Elion | 310—8.2 |
| 3,365,590 | 1/1968 | Lobdell | 310—8.2 |
| 3,399,314 | 8/1968 | Phillips | 310—8.2 |
| 3,403,271 | 9/1968 | Lobdell et al. | 310—8.2 |

WARREN E. RAY, Primary Examiner

M. O. BUDD, Assistant Examiner

U.S. Cl. X.R.

310—8.2